United States Patent
Bennett et al.

(10) Patent No.: US 7,706,609 B2
(45) Date of Patent: Apr. 27, 2010

(54) BAYESIAN DEMOSAICING USING A TWO-COLOR IMAGE

(75) Inventors: Eric P. Bennett, Durham, NC (US); Matthew T. Uyttendaele, Seattle, WA (US); Charles L. Zitnick, Seattle, WA (US); Sing Bing Kang, Redmond, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 11/343,581

(22) Filed: Jan. 30, 2006

(65) Prior Publication Data

US 2007/0177033 A1    Aug. 2, 2007

(51) Int. Cl.
G06K 9/00    (2006.01)
G06K 9/40    (2006.01)
G06K 9/32    (2006.01)

(52) U.S. Cl. ............... 382/167; 382/162; 382/275; 382/300

(58) Field of Classification Search ........... 382/162, 382/167, 300, 275
See application file for complete search history.

(56) References Cited

U.S. PATENT DOCUMENTS

| 4,642,678 | A | 2/1987 | Cok |
| 4,724,395 | A | 2/1988 | Freeman |
| 5,373,322 | A | 12/1994 | Laroche et al. |
| 5,629,734 | A | 5/1997 | Hamilton et al. |
| 2004/0075755 | A1 | 4/2004 | Rantanen et al. |
| 2004/0246444 | A1* | 12/2004 | Hirata et al. ............ 353/31 |
| 2005/0200733 | A1* | 9/2005 | Malvar ............ 348/272 |
| 2005/0201616 | A1* | 9/2005 | Malvar et al. ............ 382/167 |

FOREIGN PATENT DOCUMENTS

WO    WO-02071761 A1    9/2002

OTHER PUBLICATIONS

Kimmel, R., "Demosaicing, image reconstruction from color CCD samples", *IEEE Trans. on Image Processing* 8 (1999), pp. 1221-1228.

(Continued)

*Primary Examiner*—Bhavesh M Mehta
*Assistant Examiner*—Bernard Krasnic
(74) *Attorney, Agent, or Firm*—Lyon & Harr, L.L.P.; Craig S. Fischer (57) ABSTRACT

A Bayesian two-color image demosaicer and method for processing a digital color image to demosaic the image in such a way as to reduce image artifacts. The method and system are an improvement on and an enhancement to previous demosaicing techniques. A preliminary demosaicing pass is performed on the image to assign each pixel a fully specified RGB triple color value. The final color value of pixel in the processed image is restricted to be a linear combination of two colors. Fully-specified RGB triple color values for each pixel in an image used to find two clusters represented favored two colors. The amount of contribution from these favored two colors on the final color value then is determined. The method and system also can process multiple images to improve the demosaicing results. When using multiple images, sampling can be performed at a finer resolution, known as super resolution.

14 Claims, 8 Drawing Sheets

OTHER PUBLICATIONS

Malvar, H.S., He, L.-W., and Cutler, R., "High-quality linear interpolation for demosaicing of Bayer-patterned color images", *IEEE International Conference on Acoustics, Speech, and Signal Processing*, Montreal, Canada, May 2004.

Gupta, M., and Chen, T., "Vector color filter array demosaicing", in *Procs. of SPIE, Sensors and Camera Systems for Scientific, Industrial, and Digital Photography*, Apps.II., vol. 4306.(2001), pp. 374-382.

Brainard, D.H., "Bayesian method for reconstructing color images from trichromatic samples", *Proceedings of the IS&T 47th Annual Meeting*, Rochester, NY (1994), pp. 375-380.

Ramanath,R., Snyder,W., Bilbro,G., and Sander,W., "Demosaicking methods for bayer color arrays", *J.of Electronic Imaging*, vol. 11, No. 3, Jul. 2002, pp. 306-315.

Nayar, S., and Narasimhan, S., "Assorted pixels: Multi-sampled imaging with structural models", in *ECCV (4)*, vol. 2353 of Lecture Notes in Computer Science (2002), pp. 636-652.

Hel-Or,Y., "The canonical correlations of color images and their use for demosaicing", *Tech.Rep. HPL-2003-164R1*, Hewlett Packard Labs. Israel (2004).

Chuang, Y.Y., Curless, B., Salesin, D., and Szeliski, R., "A Bayesian approach to digital matting", in *IEEE Computer Vision and Pattern Recognition 2001*, vol. 2, Dec. 2001, pp. 264-271.

Zomet, A., and Peleg, S., "Multi-sensor super-resolution", in Procs. IEEE Workshop on Apps. of Computer Vision (2002), pp. 27-31.

Freeman, W., Jones, T., and Pasztor, E., "Example-based super-resolution", *IEEE Computer Graphics and Apps.* 22(2), Mar./Apr. 2002, pp. 56-65.

Fung, J., and Mann, S., "Projective demosaicing using multiple overlapping images", in *Proceedings of the 2004 International Symposium on Intelligent Multimedia, Video and Speech Processing (ISIMP 2004)*, Hong Kong, Oct. 22-24, 2004, pp. 190-193.

Gotoh, T., and Okutomi, M., "Direct super-resolution and registration using raw CFA images", in *CVPR*, vol. 2. (2004), pp. 600-607.

Zhang, X., and Wandell, B., "A spatial extension of CIELAB for digital color image reproduction", in *Procs.of Soc.for Information Display* (1996), pp. 731-734.

Zhang,X., and Wandell, B., "Color image fidelity metrics evaluated using image distortion maps", *Signal Processing* 70 (1998), pp. 201-214.

Fairchild, M.D., and Johnson, G. M., "The iCAM framework for image appearance, image differences, and image quality," *Journal of Electronic Imaging*, 13 (2004), pp. 126-138.

Pattanaik, S., Ferwerda, J., Fairchild, M., and Greenberg, D., "A multiscale model of adaptation and spatial vision for realistic image display". in ACM SIGGRAPH (1998), pp. 287-298.

Ramasubramanian, M., Pattanaik, S., and Greenberg, D., "A perceptually based physical error metric for realistic image synthesis", in *ACM SIGGRAPH* (1999), pp. 73-82.

Walter, B., Pattanaik, S., and Greenberg, D., "Using perceptual texture masking for efficient image synthesis", in *Procs.of Eurographics* (2002), pp. 393-400.

Lee, A., Mumford, D., and Huang, J., "Occlusion models for natural images: A statistical study of a scale-invariant dead leaves model", Int'l J. Comp. Vision 41 (2001), pp. 35-59.

Lin, Z., and Shum, H.Y., "Fundamental limits of reconstruction-based superresolution algorithms under local translation", *IEEE Trans.PAMI* 26 (2004), pp. 83-97.

European Search Report, Application No. PCT/US2007/001982 completed Jun. 14, 2007, received Jun. 14, 2007.

\* cited by examiner

BAYESIAN DEMOSAICING USING A TWO-COLOR IMAGE

BACKGROUND

Digital still cameras continue to increase in popularity and quality as the cost of such cameras continues to decline. Most digital still cameras use a single image sensor to capture color information for each pixel in a color image. The image sensor, which is typically a charge-coupled device (CCD) or a complementary metal oxide semiconductor (CMOS), is part of a sensor array that together represent the pixels of a color image.

The image sensor can only generate information about a single color at a given pixel. A color image, however, is represented by combining three separate monochromatic images. In order to display a color image, all of the red, blue and green (RGB) color values are needed at each pixel. In order to obtain the other two missing colors, a technique must be used to estimate or interpolate the missing colors from surrounding pixels in the image. This class of estimation and interpolation techniques is called "demosaicing".

The "demosaicing" term is derived from the fact that a color filter array (CFA) is used in front of the image sensors, with the CFA being arranged in a mosaic pattern. This mosaic pattern has only one color value for each of the pixels in the image. In order to obtain the full-color image, the mosaic pattern must be "demosaiced". Thus, demosaicing is the technique of interpolating back the image captured with a mosaic-pattern CFA, so that a full RGB value can be associated with every pixel.

More specifically, a single-sensor digital camera captures the image using an image sensor array that is preceded in the optical path by a CFA. A highly popular and common mosaic CFA is called the Bayer mosaic pattern. For each 2×2 set of pixels, two diagonally opposed pixels have green filters, and the other two pixels have red and blue filters. Since the color green (G) carries most of the luminance information for humans, its sampling rate is twice that of the color red (R) and the color blue (B).

There are many types of demosaicing techniques currently available, such as bilinear interpolation, median filtering, vector CFA, gradient-based, and statistical modeling. However, each of these current demosaicing techniques produces visual and quantitatively measurable artifacts. These artifacts include aliasing or "zippering" artifacts, where every other pixel along an edge alternates between being considered on or off the edge, and color fringing, where yellows, purples, and cyans appear along or on sharp edges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The Bayesian two-color image demosaicing method and system disclosed herein includes processing a digital color image to demosaic the image in such a way as to reduce image artifacts. The Bayesian two-color image demosaicing method and system employs an image model that models colors across an edge as a linear combination of the colors on each side. This decreases the possibility of inducing color fringing. Moreover, the statistical model used by the Bayesian two-color image demosaicing method and system is not grid-based, thus easily allowing for extensions to both multi-image demosaicing for video processing and non-iterative super-resolution output sampling. By constraining the output image to a linear model, visible noise in smooth areas also is reduced while preserving sharp edges.

The Bayesian two-color image demosaicing method and system is an improvement on and an enhancement of existing demosaicing techniques. The method and system performs a preliminary demosaicing pass on an image to assign each pixel in the image a fully specified RGB triple color value. The results of this preliminary pass then are improved by the Bayesian two-color image demosaicing method and system. The general idea is that within a small window or processing region (such as a 5×5 pixel "patch") that is centered on a pixel being processed, an assumption is made that there only exists two colors within that processing region. Assuming only two colors results in the virtual elimination of random colors in the final result. The color of the pixel then is restricted to be a linear combination of those two colors. This alleviates spurious colors that cause the color artifacts.

Bayesian two-color image demosaicing method includes obtaining fully-specified RGB triple color values for each pixel in an image and then using the RGB triples to determine a final color value for each pixel. The final color value is a combination of and only has contribution from two colors. The two colors are found by clustering the fully-specified RGB triples into two clusters, taking the mean of each cluster, and calling the means of each cluster the favored two colors.

Once the favored two colors are found, it must be determined how much contribution each color gives to the final color value. This is achieved by computing a fractional blended value for each pixel using samples in a processing region obtained from a Bayer color filter. Next, the maximum fractional blended value is found by finding the maximum probability of the fractional blended value given the set of samples. The final color value is computed from the maximum fractional blended value and the favored two colors.

The Bayesian two-color image demosaicing method and system also can process multiple images to improve the demosaicing results. The multiple images first are registered with each other so that they are aligned. A reference image is selected, and the other images are reconstructed relative to the reference image. The processing is similar to the single image case, except that a technique is used to compensate for imperfect alignment of the images. The compensation technique uses a scaling factor to increase the variance of the Gaussian if the sum of the squared differences is large. This scaling factor varies based on the quality of the alignment algorithm.

When using multiple images, the Bayesian two-color image demosaicing method and system also can sample at a finer resolution, which is known as super resolution. When super-resolving, the statistical clustering and local neighborhood sizes can be slightly shrunk to capture fine details. Other than that, the system operates similarly as it did in the multi-image demosaicing case.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of the Bayesian two-color image demosaicing method and system, reference is made to the accompanying drawings, which form a part thereof, and in which is shown by way of illustration a specific example whereby the Bayesian two-color image demosaicing method and system may be practiced. It is to be understood that other embodiments may be utilized and structural changes may be made without departing from the scope of the claimed subject matter.

I. General Overview

Figure 1:
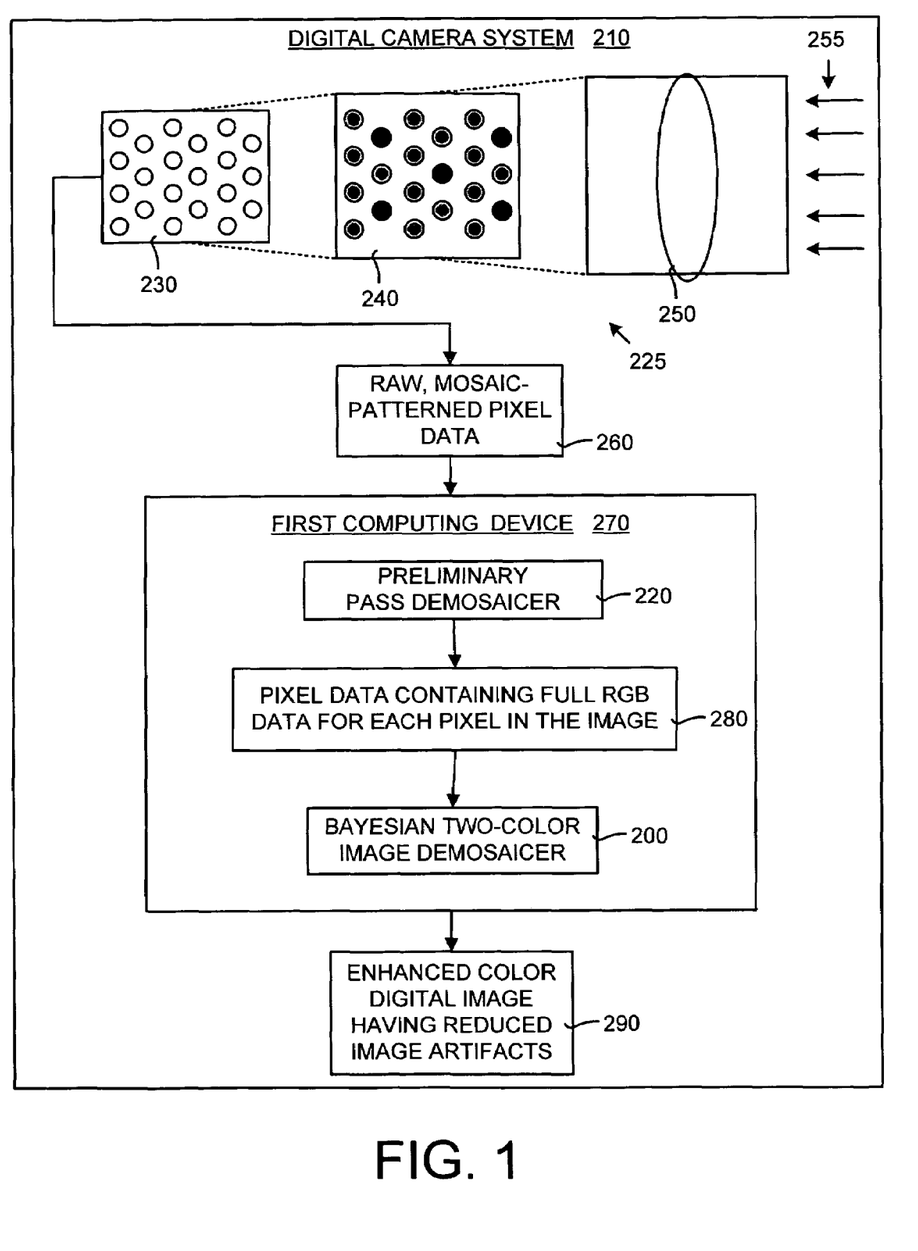
FIG. 1 is a block diagram illustrating a first exemplary implementation of the Bayesian two-color image demosaicing method and system disclosed herein.
Figure 2:
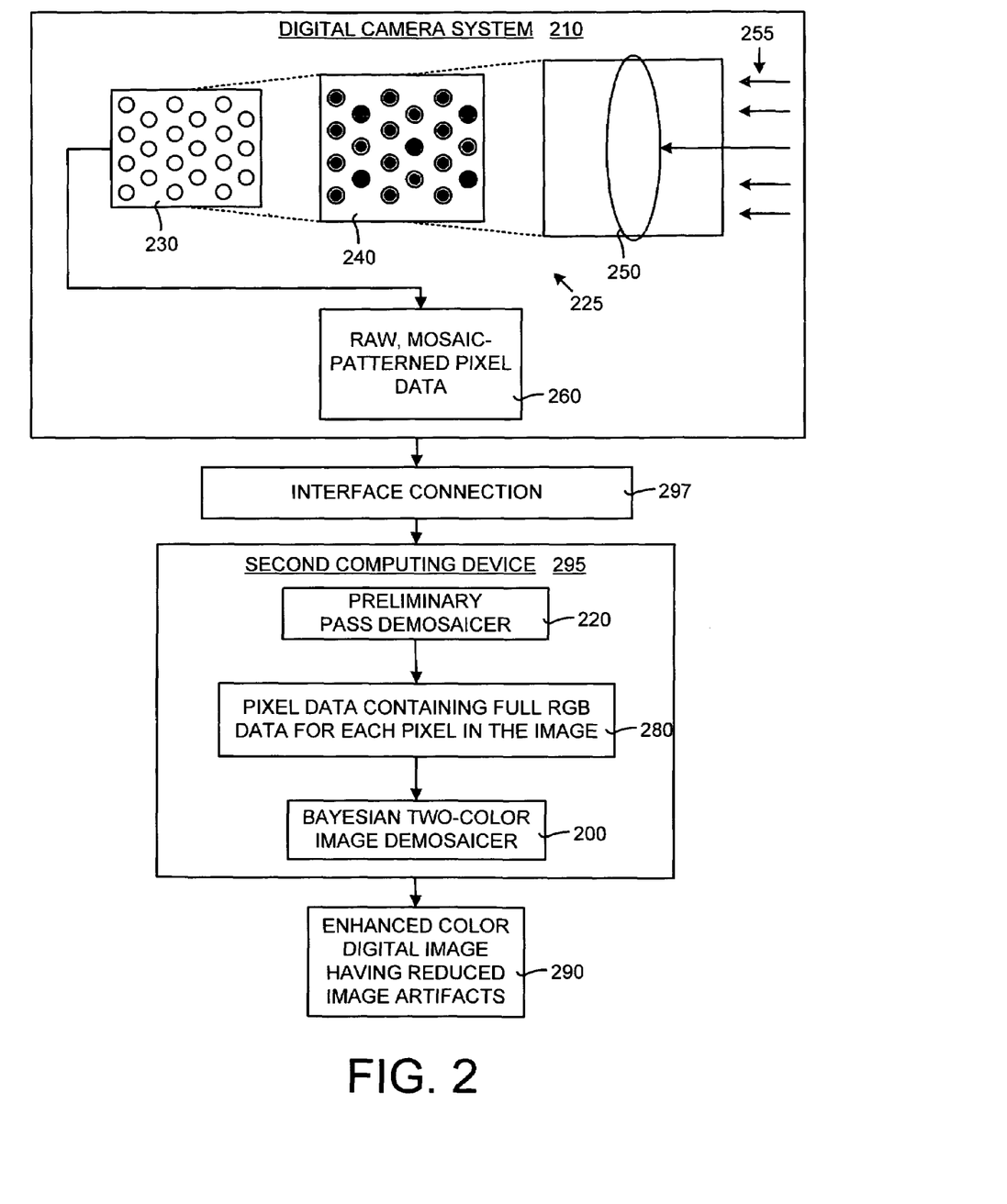
FIG. 2 is a block diagram illustrating a second exemplary implementation of the Bayesian two-color image demosaicing method and system disclosed herein.

FIGS. 1 and 2 are block diagrams illustrating two exemplary implementations of the Bayesian two-color image demosaicing method and system disclosed herein. It should be noted that FIGS. 1 and 2 are merely two of several ways in which the Bayesian two-color image demosaicing method and system may be implemented and used.

Referring to FIG. 1, in the first exemplary implementation, the Bayesian two-color image demosaicer 200 resides on a digital camera system 210. In general, the Bayesian two-color image demosaicer 200 provides enhancement to a color image (not shown) subsequent to a preliminary demosaicing pass made using a preliminary pass demosaicer 220. More specifically, as shown in FIG. 1, the Bayesian two-color image demosaicer 200 is part of the digital camera system 210 that includes an image sensor array 225. The array 225 is made up of a plurality of image sensors, where each image sensor is capable of determining a single color value.

The image sensor array 225 includes a sensor substrate 230, a color filter array (CFA) 240, and lens 250. It should be noted that typically the lens 250 is disposed over the CFA 240, which in turn is disposed over the substrate 230, as indicated in FIGS. 1 and 2 by the dashed lines. The light from the image to be captured (not shown) enters the digital camera system 210 (as shown by the arrows 255). The purpose of the lens 250 is to focus the incoming light 255 onto the image sensor array 225. Each sensor in the image sensor array 225 represents a pixel. The CFA 240 changes the color response of each pixel. The sensor substrate 230 captures the specific color incoming light (as dictated by the CFA 240) and generates an electrical signal. In this manner, the image sensor array 225 samples the incoming light 255 from an image with red, green and blue sensors arranged in the image sensor array 225.

Each pixel in the image sensor array 225 is the output of a red, green or blue sensor. Thus, the sensor output is an electrical signal from each sensor that corresponds to a single color value for each pixel in the image sensor array 225. The output is raw, mosaic-patterned pixel data 260. As mentioned above, in order to display the full color image, color information for red, green and blue colors must be obtained at each pixel. This is achieved by demosaicing, or the interpolating the missing color values in the mosaic-patterned pixel data 260.

The raw, mosaic-patterned pixel data 260 is sent to a first computing device 270 located onboard the digital camera system 210. Residing on the first computing device 270 are the preliminary pass demosaicer 220 and the Bayesian two-color image demosaicer 200. The preliminary pass demosaicer 220 is used to interpolate an estimate of the missing color values. The output of the preliminary pass demosaicer 220 is pixel data 280 containing full RGB color values for each pixel in the color image captured by the digital camera system 210. The Bayesian two-color image demosaicer 200 receives the pixel data 280 and processes this data 280 as described in detail below. After processing by the Bayesian two-color image demosaicer 200, an enhanced color digital image having reduced image artifacts 290 is obtained.

Referring now to FIG. 2, in the second exemplary implementation the Bayesian two-color image demosaicer 200 resides on a second computing device 295 that is separate from the digital camera system 210. The raw mosaic-patterned pixel data 260 is sent from the digital camera system 210 to the second computing device 295. This pixel data 260 typically is sent to the second computing device 295 via an interface connection 297, which can be a USB interface, an IEEE 1394 interface, a Bluetooth® interface, or any other interface suitable for carrying the raw pixel data 260 from the digital camera system 210 to the second computing device 295. As detailed below, the Bayesian two-color image demosaicer 200 uses the Bayesian two-color image demosaicing method to enhance the pixel data 260 and provides the enhanced color digital image having reduced image artifacts 290.

II. Operational Overview

Figure 3:
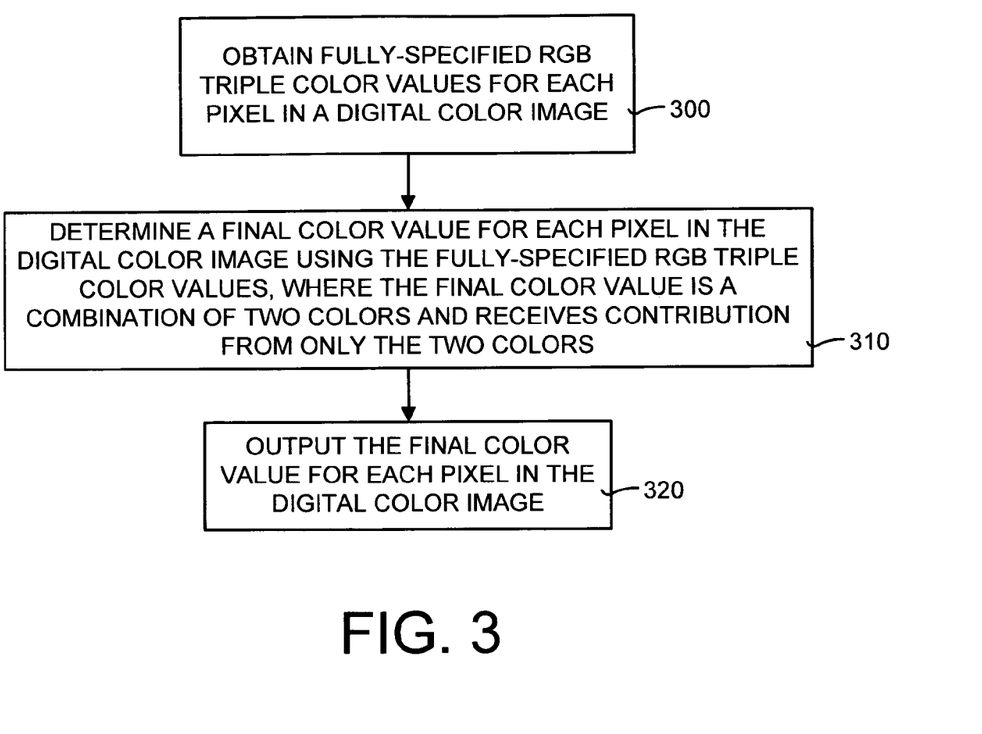
FIG. 3 is a general flow diagram illustrating the general operation of the Bayesian two-color image demosaicer shown in FIGS. 1 and 2.

The operation of the Bayesian two-color image demosaicer 200 and method used therein shown in FIGS. 1 and 2 now will be discussed. FIG. 3 is a general flow diagram illustrating the general operation of the Bayesian two-color image demosaicer 200. In general, the Bayesian two-color image demosaicing method inputs pixel color values for pixels in an image, processes each of the pixels, and outputs a processed image that has reduced image artifacts.

More specifically, as shown in FIG. 3, the Bayesian two-color image demosaicing method begins by obtaining a fully-specified red (R), green (G), and blue (B) triple color values for each pixel in a digital color image (box 300). Fully-specified RGB triple means that the red, green, and blue color values are available for the pixel. Typically, the Bayesian two-color image demosaicing method obtains these fully-specified RGB triple color values by performing a preliminary demosaicing pass on the digital color image. The Bayesian two-color image demosaicing method then enhances the results of the preliminary demosaicing pass.

Next, the Bayesian two-color image demosaicing method determines a final color value for each pixel in the digital color image (box 310). The final color value is a combination or blend of two colors, where the two colors are obtained by using at least some of the fully-specified RGB triple color values. In other words, even though there may be several colors contained in the fully-specified RGB triple color values, only a combination of two of those color values is used in determining a final color value for the pixel being processed. The output is a final color value that is found for each of the pixels in the digital color image (box 320).

III. Operational Details and Working Example

Figure 4:
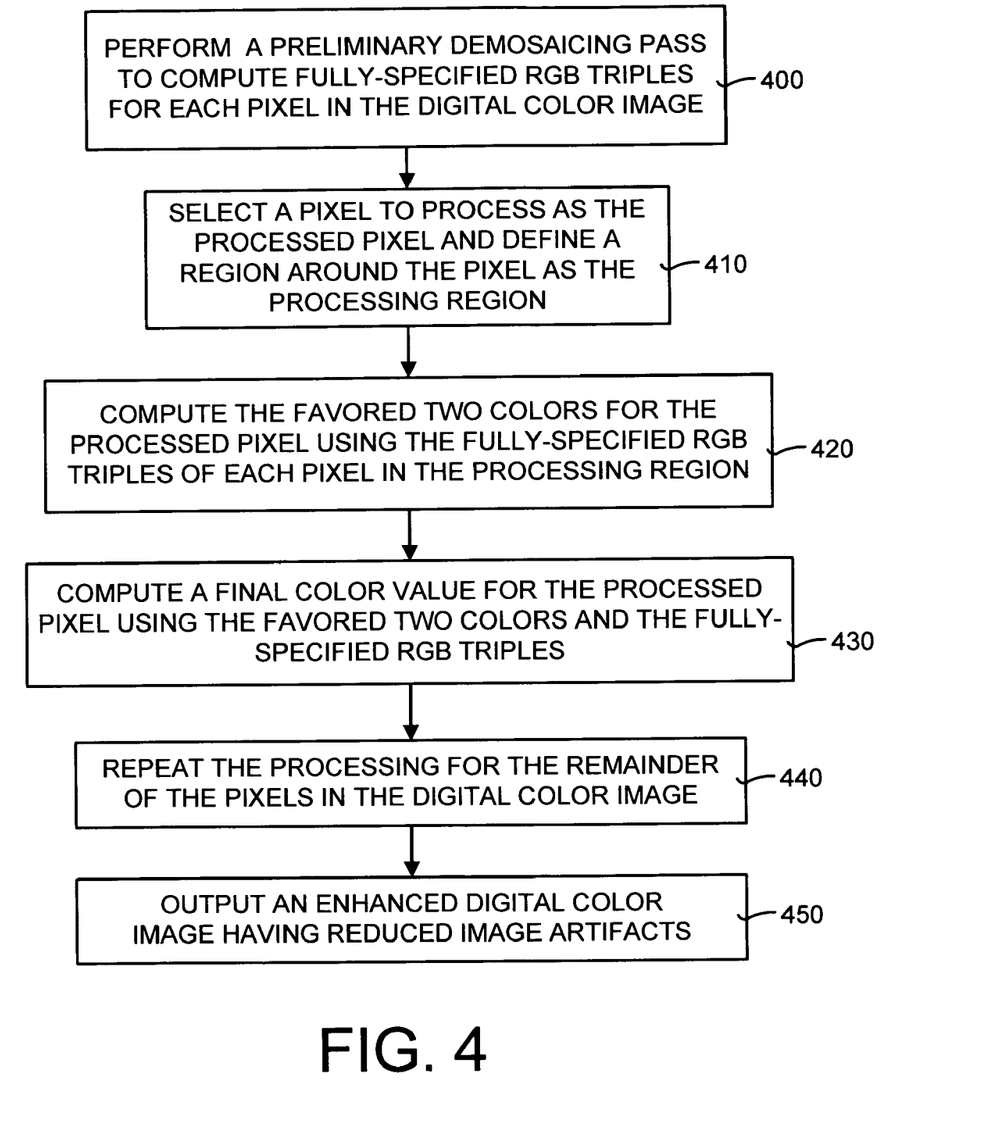
FIG. 4 is a detailed flow diagram illustrating the further details of the operation of the Bayesian two-color image demosaicing method shown in FIG. 3.

The details of the Bayesian two-color image demosaicing method now will be discussed. FIG. 4 is a detailed flow diagram illustrating the further details of the operation of the Bayesian two-color image demosaicing method shown in FIG. 3. In particular, a preliminary demosaicing pass is performed to compute the fully-specified RGB triples for each pixel in the digital color image (box 400). Initially, there is a Bayer pattern for the image, in which there is only an R, a G, or a B color value for each pixel in the image. The preliminary demosaicing pass uses a demosaicing technique to obtain an actual full color (RGB) value at each one of the pixels in a processing region centered at a pixel being processed. In one embodiment, the preliminary demosaicing pass is performed using a bilinear interpolation technique. In alternative embodiments, other types of preliminary pass demosaicing techniques may be used, such as median filtering techniques, vector CFA techniques, gradient-based techniques, and statistical modeling techniques. When selecting a preliminary pass demosaicing technique, however, it should be noted that the technique that will give the best input also yields the best output by the Bayesian two-color image demosaicing method.

Next, a pixel is selected for processing and is defined as a processed pixel. In addition, a region around the processed pixel is defined as a processing region (box 410). The processing region (or "window" or "patch") typically is a 5×5 pixel patch, although other sizes are possible. In one embodiment, the patch size is odd, such that the processed pixel is centered in the processing region. By way of example, in a 5×5 processing regions, the processed pixel would be the center pixel of the 5×5 patch.

Favored two colors then are computed for the processed pixel (box 420). This is achieved using the fully-specified RGB triples of each pixel in the processing region. As explained in detail below, the fully-specified RGB triples may contain several colors, but those colors are clustered into only two favored colors. A final color value for the processed pixel is computed using the favored two colors and the fully-specified RGB triples (box 430). The process of selecting a pixel, defining a processing region, computing the favored two colors, and computing a final color value all are repeated for the remainder of the pixels in the digital color image (box 440). The output of the Bayesian two-color image demosaicing method is an enhanced digital color image having reduced image artifacts (box 450).

Figure 5:
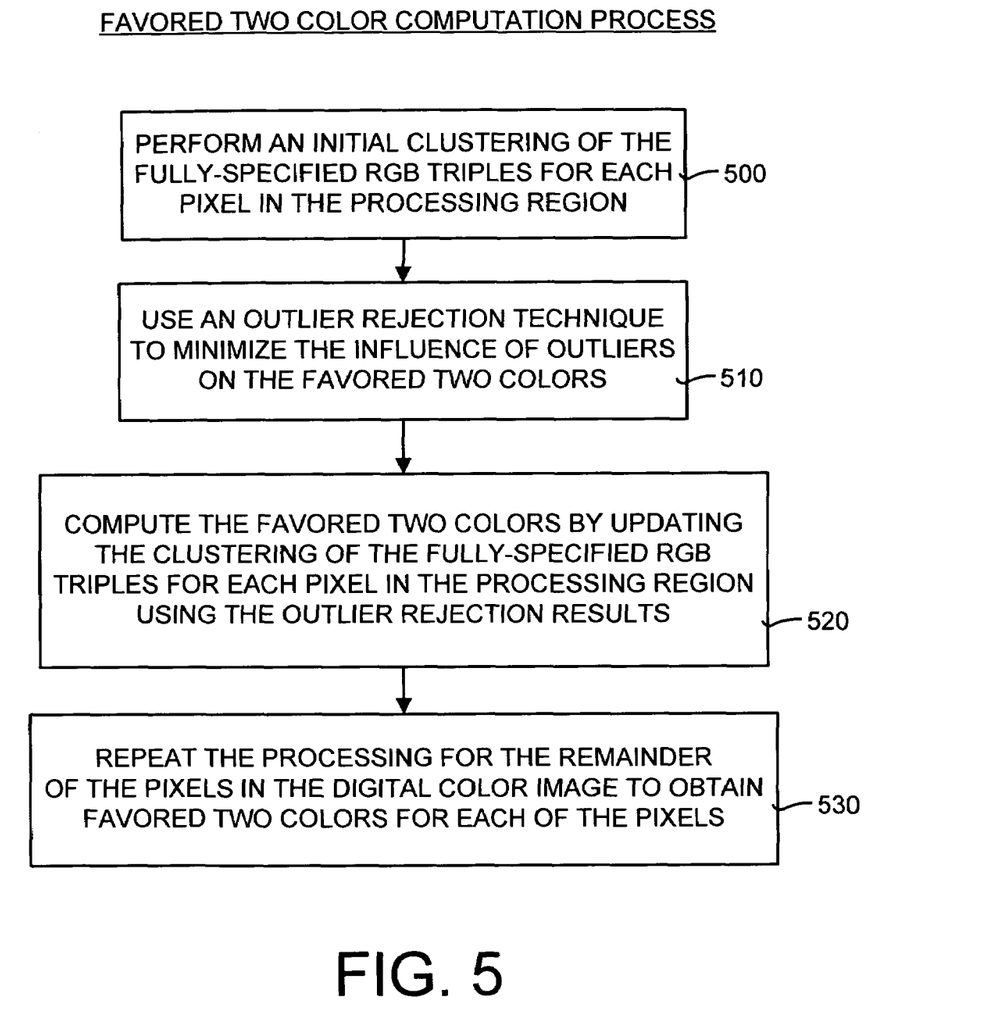
FIG. 5 is a flow diagram illustrating the favored two color computation process.

FIG. 5 is a flow diagram illustrating the favored two color computation process. In other words, FIG. 5 illustrates how the favored two colors are found from among the color values of pixels in the processing regions. The process begins by performing an initial clustering of the fully-specified RGB triples for each pixel in the processing region (box 500). Assuming that the processing region is 5×5 pixels, the goal is to find the favored two colors from among the 25 color values in the 5×5 processing region, and group these 25 color values into 2 favored colors. This can be done generally using any clustering technique. In one embodiment, a k-means technique is used because of its efficiency. The "k" in the k-means technique refers to the number of cluster types, where, in this case, k=2. The k-means clustering technique is a balance between accuracy and speed. The k-means clustering technique is well known by those having skill in the art, and will not be discussed in further detail. In alternative embodiments, an expectation maximization (EM) technique or mean shift technique is used.

The one problem, however, with the k-means technique, is that an outlier can adversely affect the results. An outlier is a data point that is located far from the rest of the data. A statistical distribution expects data points to fall within a specific range, and those that do not are called outliers. In order to correct for outliers, the favored two color computation process includes an outlier rejection technique. The outlier rejection technique is used to minimize the influence of outliers on the favored two colors (box 510).

The favored two colors then are computed by updating the clustering of the fully-specified RGB triples for each pixel in the processing region by using the outlier rejection results (box 520). The processing then is repeated for the remainder of the pixels in the digital color image (box 530). Favored two colors for each pixel then are obtained for each pixel in the image.

Figure 6:
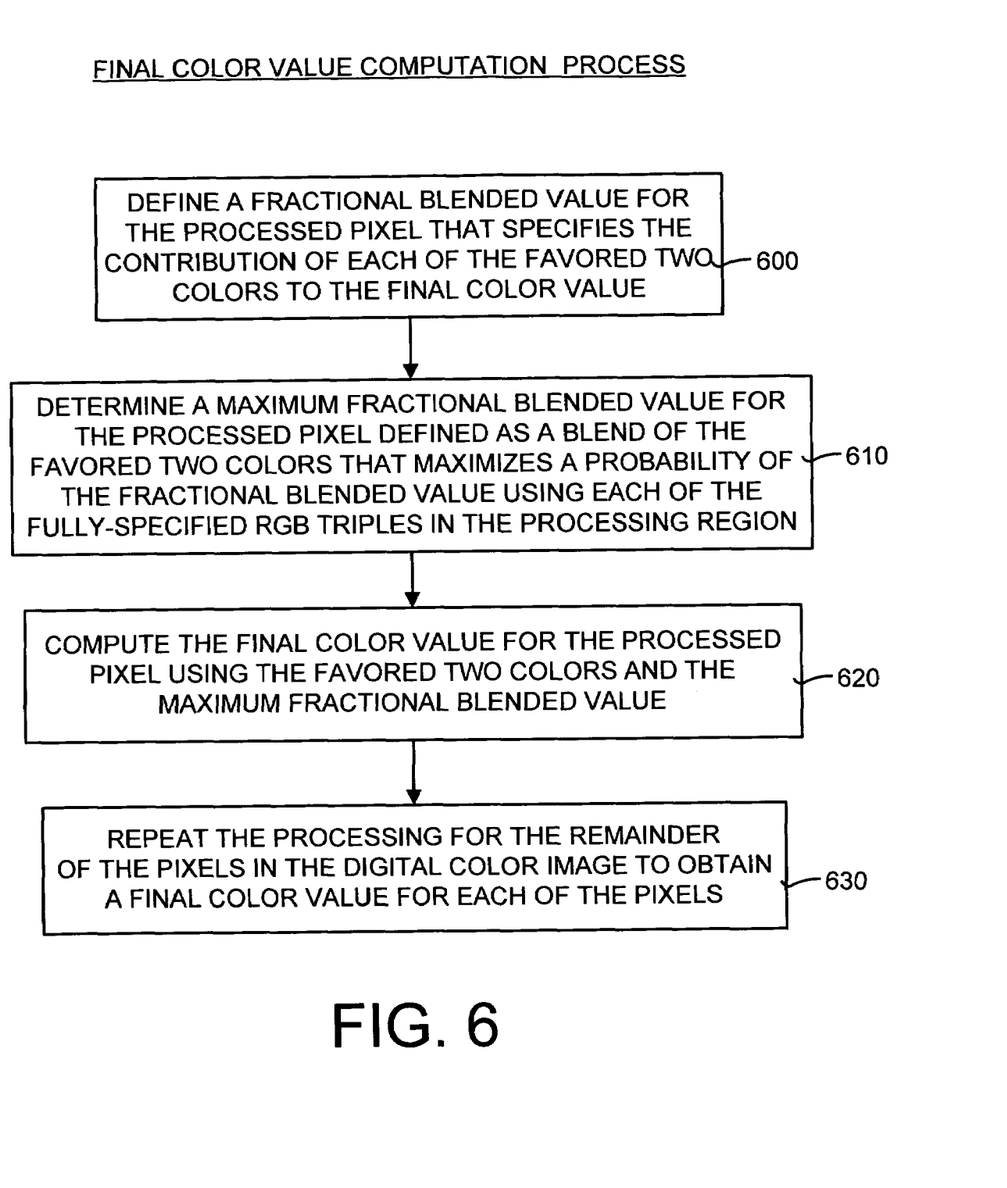
FIG. 6 is a flow diagram illustrating details of the final color value computation process.

FIG. 6 is a flow diagram illustrating details of the final color value computation process. The process begins by defining a fractional blended value for the processed pixel that specifies the contribution of each of the favored two colors to the final color value (box 600). Thus, the fractional blended value determines how much contribution the final color value of the pixel gets from each of the favored two colors.

A maximum fractional blended value then is determined for the processed pixel (box 610). The maximum fractional blended value is defined as a blend or combination of the favored two colors that maximizes a probability of the fractional blended value using each of the fully-specified RGB triples in the processing region. This involves possibly looking for more than one set of colors, and then trying all those colors out to see which one gives the maximum value. For example, imagine trying three colors, J, K, and L, and trying all combinations of J, K, and L, and seeing which one gives the highest probability. Thus, out of all the colors, the favored two colors are the best two colors that explain the processed pixel. The "best" two colors means the two colors that maximizes the argument of the maximum (or "arg max") of equation (3) given below. The arg max is the value of a given argument for which the value of a given expression attains its maximum value.

A final color value then is computed for the processed pixel using the favored two colors and the maximum fractional blended value (box 620). This final color value is set forth in equation (1) given below. The above processing is repeated for the remainder of the pixels in the digital color image in order to obtain a final color value for each of the pixels (box 630).

In order to more fully understand the Bayesian two-color image demosaicing method and system disclosed herein, the operational details of an exemplary working example are presented. It should be noted that this working example is only one way in which the Bayesian two-color image demosaicing method and system may be implemented.

A central assumption to processing by the Bayesian two-color image demosaicing method and system is that at most two representative colors exist within a local neighborhood. The final color value of every pixel within that neighborhood is either one of the representative colors or is a combination of both. In this working example, the combination of the representative colors was a linear combination. Although this assumption was violated in areas where more than two different colors meet, such occurrences were relatively rare. Thus, the Bayesian two-color image demosaicing method and system is very robust.

To discover the underlying two color model at each pixel, the neighborhood surrounding each pixel was clustered into those two colors. The Bayer image provided only a single channel sample, leaving two unknown RGB triple color values and an unknown blending coefficient to specify the model. In this working example, a weighted k-means technique was used in which the weight is the inverse Euclidean distance from each sample to the center of the kernel. Note that cluster sizes are not balanced, so a single pixel detail in an otherwise smooth area can be preserved. Also, clustering can be performed in other color spaces, such as $L\alpha\beta$ or XYZ, but processing in these spaces made little difference in the accuracy of the clusters.

The neighborhood size of samples to cluster is a function of how large color details appear in the source image. In this working example, a two pixel radius around the kernel's center was found to work well. This supplied a sufficient number of samples from each of the Bayer color channels.

Because it is possible that more than two colors may exist in a local image area or that significant noise may be present, the Bayesian two-color image demosaicing method and system also used an outlier rejection technique. Using the mean and variance of the clusters, samples that were outside of a single standard deviation of their closest cluster mean were rejected. The k-means technique then was repeated to obtain cleaner cluster means. This provided better reproduction where color values changed rapidly away from the kernel center.

The major factor in the quality of clustering is the choice of a preliminary pass demosaicing technique used for the "bootstrapping" demosaicing to make clustering tractable. Although many types of preliminary pass demosaicing techniques may be used (as listed above), there are qualities that improve performance. The first is preservation or accentuation of high frequency features. Techniques such as bilinear interpolation and median interpolation have a tendency to low-pass filter, which should be avoided. Alternately, algorithms that preserve high frequencies are prone to generate edge fringing and aliasing. In this working example, a high-quality linear interpolation (HQLI) technique was used in the preliminary pass demosaicing because it preserved high frequencies and did not generate many fringing artifacts.

Two-Color Demosaicing

The two color model provides two RGB priors, $\bar{J}$ and $\bar{K}$, for each pixel x in the image. The color C of pixel x was assumed to be a linear combination these two colors, given by:

$$C = (1-\alpha)\bar{J} + \alpha\bar{K}. \qquad (1)$$

Equation (1) is a blending equation, and computes the final color value, C, for the pixel x.

Within a neighborhood of the pixel x, the Bayer sensor gives a set of samples $s_i \epsilon S$. The index of the RGB color channel specified by sample $s_i$ is denoted by $t_i$, and $\alpha$ is the fractional blended value.

If $\bar{J}_{t_i}$ specifies the by $t_i$th color channel for color $\bar{J}$, and similarly for $\bar{K}$ and C, then the unknown value of the fractional blended value, $\alpha$, could be computed directly from the Bayer sample $s_x$ at location x (the central pixel) as:

$$\alpha = \frac{s_x - \bar{J}_{t_x}}{\bar{K}_{t_x} - \bar{J}_{t_x}}. \qquad (2)$$

However, if the difference between $\bar{J}_{t_x}$ and $\bar{K}_{t_x}$ is small, the estimate of $\alpha$ will be inaccurate due to discretization and image noise. Note that s is an element of S for $s_i$, where, for a 5×5 processing regions, i ranges from 1-25, such that there are 25 $s_i$'s. The $s_i$'s are only for a single channel (or color), and the color is specified by the $t_i$'s (either R, G, or B).

A more robust estimate of $\alpha$ using the entire set of samples S is desired. In other words, it is desired to find the most likely value (or maximum fractional blended value) $\hat{\alpha}$ of $\alpha$ given a sample set S and color priors $\bar{J}$ and $\bar{K}$:

$$\hat{\alpha} = \underset{\alpha}{\mathrm{argmax}} P(\alpha | S, \bar{J}, \bar{K}). \qquad (3)$$

For equation (3), the $\bar{J}$ and $\bar{K}$ are the favored two colors. In color space, it can be imagined that a line is drawn from $\bar{J}$ to $\bar{K}$, and that the fractional blended value $\alpha$ varies from 0 to 1 and beyond. This means that $\alpha=0$ at $\bar{K}$ and $\alpha=1$ at $\bar{J}$. In other words, equation (3) finds the arg max of $\alpha$ that maximizes the probability of $\alpha$, given S, where S is the set of all the samples of colors that are in the processing regions (a 5×5 patch in this working example). It should be noted that S is only contains samples that are actually sampled, and not obtained by demosaicing.

Using Bayes' theorem, and assuming $\bar{J}$ and $\bar{K}$ are independent of S and $\alpha$, equation (3) can be rearrange to yield:

$$P(\alpha | S, \bar{J}, \bar{K}) = \frac{P(S | \alpha, \bar{J}, \bar{K}) P(\alpha)}{P(S)}. \qquad (4)$$

Assuming all $s_i$'s are independent, it is found:

$$P(\alpha | S, \bar{J}, \bar{K}) \propto P(\alpha) \prod_i P(s_i | \alpha, \bar{J}, \bar{K}). \qquad (5)$$

$\bar{J}$, $\bar{K}$, and $\alpha$ specify a predicted color, $C^* = (1-\alpha)\bar{J} + \alpha\bar{K}$ for pixel x. Assuming an independent identical distribution (i.i.d.) for neighboring color noise, the relationship between $C^*_{t_i}$ and $s_i$ can be modeled using a normal distribution:

$$P(s_i | \alpha, \bar{J}, \bar{K}) \propto \exp\left(-\frac{(s_i - C^*_{t_i})^2}{2\sigma_i^2}\right). \qquad (6)$$

Equation (6) computes the probability using a Gaussian. C* is the color computed given an $\alpha$. The distribution between neighboring pixels is highly kurtotic, but for computational efficiency, a Gaussian distribution is assumed. The variance $\sigma_i^2$ is dependent on two factors: (1) the global per-channel image noise $\sigma_N$; and, (2) the pixel distance between x and $s_i$. It is assumed that pixel colors are locally similar, and less similar farther away. Thus, the variance between $s_i$ and $C_{t_i}$ increases as their distance in image space increases. In one embodiment, the variance $\sigma_i$ is computed as:

$$\sigma_i = \sigma_N(1+\lambda\Delta_d), \quad (7)$$

where $\Delta_d$ is the pixel distance between x and $s_i$, and $\lambda$ is a constant that, in this working example, is empirically set to 6. Thus, equation (7) states that the variance increases linearly with distance from the center pixel (the processed pixel), or the pixel in the center of the processing region. In alternative embodiments, other monotonically increasing functions of distance may be used.

The width of the Gaussian, or the variance, $\sigma^2$, indicates how much influence a particular sample has on the final result. Another way to think about it is that it is the certainty of the sample. If there is uncertainty about a sample, its Gaussian will have a large width (or large variance, $\sigma^2$). Conversely if there is certainty about a sample, its Gaussian will have a narrow width (or small variance, $\sigma^2$).

Equation (7) is a function that states that the variance increases with the distance from the processed (or center) pixel, around which the processing region is centered. In other words, pixels that are closer to the center pixel are more desirable and have a higher weight. And the more variance, the less influence that pixel or sample has on the final result. Thus, the variance should increase with the distance from the center pixel, by some function. Although a linear function in the form of equation (7) was used in this working example, other types of functions that state the variance in a similar way could also be used.

Since the value of si $i_s$ known and it is desired to compute the value of $\alpha$ that maximizes equation (6), it is useful to rearrange it as follows:

$$\exp\left(-\frac{(s_i - ((1-\alpha)\overline{J}_{t_i} + \alpha\overline{K}_{t_i}))^2}{2\sigma_i^2}\right) = \exp\left(-\frac{\left(\alpha - \frac{s_i - \overline{J}_{t_i}}{\overline{K}_{t_i} - \overline{J}_{t_i}}\right)^2}{2\left(\frac{\sigma_i}{\overline{K}_{t_i} - \overline{J}_{t_i}}\right)^2}\right). \quad (8)$$

Equation (8) is a Gaussian over $\alpha$ with mean $\alpha_i$ and variance $\sigma_{\alpha_i}^2$;

$$\alpha_i = \frac{s_i - \overline{J}_{t_i}}{\overline{K}_{t_i} - \overline{J}_{t_i}} \text{ and } \sigma_{\alpha_i}^2 = \left(\frac{\sigma_i}{\overline{K}_{t_i} - \overline{J}_{t_i}}\right)^2. \quad (9)$$

It is actually desired to solve for $\alpha$, so we rearrange the equations to get equation (10). In particular, equations (5) and (8) can be combined to yield:

$$P(s_i | \alpha, \overline{J}, \overline{K}) \propto \prod_i \exp\left(-\frac{(\alpha - \alpha_i)^2}{2\sigma_{\alpha_i}^2}\right). \quad (10)$$

The optimal value of $\alpha$ for $P(s_i|\alpha, \overline{J}, \overline{K})$ is:

$$\alpha^* = \frac{\sum_i (\sigma_{\alpha_i}^{-2} \alpha_i)}{\sum_i \sigma_{\alpha_i}^{-2}} \quad (11)$$

In practice, the contribution of color components is ignored where the absolute difference between $\overline{J}_{t_i}$ and $\overline{K}_{t_i}$ is less than 2.0.

When solving equations (10) and (11), the $\alpha_i$'s, and the $\sigma_i$'s need to be found, where the $\sigma'_2$'s are the variances associated with each of the samples. The optimal fractional blended value, $\alpha^*$, then is found, which is the optimal $\alpha$ value. $\alpha^*$ then is used to compute the final color value. A slight penalty is imposed for an $\alpha$ value that is not 0 or 1. Consequently, in one embodiment, $\alpha$ has a value of 0, while in an alternative embodiment, $\alpha$ has a value of 1.

Next, a determination is made as to which $\alpha$ (0, 1, or $\alpha^*$) yields the highest value for equation (5). In other words, equation (5) is evaluated with each of these three $\alpha$'s to determine which $\alpha$ gives the highest answer. For equation (10), the $\alpha_i$'s and the $\sigma_{\alpha i}$'s then are computed. The $\alpha_i$'s are computed using equation (9). Given the sample $s_i$, equation (9) computes the value of $\alpha$ In other words, $\alpha$ is what the sample $s_i$, says that $\alpha_i$ should be. In equation (10), a product of the $\alpha_i$'s is used. If a Gaussian is multiplied by a Gaussian, another Gaussian is obtained. The value of the peak of the Gaussian all the Gaussians of the each of the 25 samples are multiplied together is represented by the $\alpha_i^*$, given by equation (11). It can be shown that the mean of the product of all the Gaussians is going to be equation (11), which is a weighted averaging.

Finally, to find the value of $\hat{\alpha}$ in equation (3), a prior must be defined over $\alpha$. $P(\alpha)$. Given that most pixels within an image only get contribution from a single color, $\alpha$ is biased to have a value of 0 or 1:

$$P(\alpha) = \begin{cases} 1 & : \alpha \in \{0, 1\} \\ \eta & : \text{otherwise} \end{cases} \quad (12)$$

where $\eta$ is always less than 1 ($\eta<1$). The value of $\eta$ depends upon the amount of smoothing desired. Given a large amount of image noise, $\eta \approx 1$.

Since the $\alpha$ prior function is flat with two impulses, only the value of equation (3) at three points: 0, 1, and $\alpha^*$ needs to be examined. Whichever is the maximum is assigned as the final value $\hat{\alpha}$ for the pixel being processed, with a corresponding pixel color of $(1-\hat{\alpha})\overline{J}+\hat{\alpha}\overline{K}$.

The quantitative error of this approach can be further decreased by forcing the red, green, or blue at an output pixel to be the value originally captured by the sensor, while setting the other two channels to be consistent with $\hat{\alpha}$. Because $\lambda$ weights the central sample heavily, it is unlikely that these two values will be very different. Also; if the output sampling is done on a grid differing from the input grid, a source Bayer sample is not available at each pixel.

Multi-image Demosaicing

Using the gridless Bayesian solution, information from multiple images can be introduced into the model without significantly altering the methodology. These supporting images are assumed to be similar, but not exactly the same, such as from subsequent video frames. Furthermore, these additional Bayer samples can be used without resampling them. To use supporting images, a per-image projective mapping must be computed to register each image to the first image.

The Bayesian two-color image demosaicing method and system can get samples from multiple images, as long as they are registered. Registering the images allows multiple images of a scene to be aligned together so they can be used. However, when the image are aligned they may not be oriented the same. The Bayesian two-color image demosaicing method and system selects a reference image and reconstructs the other images relative to the reference image. The processing region then becomes circular, and samples are taken within a certain radius of the processed (or center) pixel.

In general, better results are obtained by using more images. However, there is a trade-off between processing time and quality. In one embodiment, the number of images used is 3, such that the processing time is fairly short and the quality is very good. In alternative embodiments, the number of images used may be more or less than three.

As more images are added, the neighborhood of samples used can be shrunk while still maintaining sufficient samples to cluster into $\bar{J}$ and $\bar{K}$. By doing so, the likelihood of it containing more than two representative colors is reduced. Thus, if an R, G, and B sample each appear close to the sample being reconstructed, nearest neighbor interpolation combination of Bayer samples could be used. The notion of using weighted clustering and reconstruction remain the same as with a single input image. Once registered, even if the same color channel appears at the same pixel location, there is still a benefit, namely, noise reduction.

By including supporting images, there is a risk of introducing bad or misleading data. The global projective mapping does not account for all scene changes (moving camera, moving objects, changes in lighting conditions and object appearance). Errors in registration could occur. To reduce such errors, it is ensured that only data from the reference and supporting images that are locally similar are combined. Similarity is measured in RGB space using a Sum of Absolute Differences (SAD) technique over a local window of 7×7, denoted as $\epsilon$.

Multiple images are handled by adjusting the definition of $\sigma_i$ to include the correlation error between the reference and supporting images:

$$\sigma_i = \sigma_N (1 + \lambda \Delta_d)(1 + \tau \epsilon). \quad (13)$$

The term $(1+\tau\epsilon)$ is the mismatch penalty, with $\tau=0.1$ in this working example. $\epsilon$ is the sum of squared differences.

When the multiple images are aligned, the alignment may not be perfect. To compensate for this, a sum of squares differences is used. Instead of using equation (7), equation (13) is used. The only difference is the last term, $(1+\tau\epsilon)$. The $\tau$ is a scaling factor. So the last term in equation (13), $(1+\tau\epsilon)$, states that the variance of the Gaussian is increased if the sum of the squared differences is large.

The term $\tau$ is how much the sum of the squared differences value is weighed. It is determined empirically. In one embodiment, $\tau$ equals approximately 0.1. In alternative embodiments, other values of $\tau$ may be used. However, it is important that $\tau$ not be weighed too heavily. If $\tau$ is too large, then information from other images may never be used. If $\tau$ is too small, then information from other images may be used even if the images are not properly aligned. Thus, a balance must be found. The term $\tau$ varies based on the quality of the alignment algorithm.

To implement multi-image demosaicing, all that is required is adding nearby Bayer samples in the supporting images to the set S and using the above variance equation. It should be noted that the samples in S are the Bayer sensor samples because using the original samples avoids the need for any resampling.

Super-Resolution

Another advantage of the statistical, grid-less approach of the Bayesian two-color image demosaicing method and system is that any sampling grid can be used for the reconstruction, such as a sampling grid having a greater resolution than the original images. Because floating-point Euclidean distances are used for the statistical measures, a continuous value of $\alpha$ can be generated anywhere in the image. Due to the alignment of samples from multiple images, the value of $\alpha$ may encode edges and sharpness between the pixels in the original grid. This can be exploited to handle super-resolution within the framework of the Bayesian two-color image demosaicing method and system.

When super-resolving, the statistical clustering and local neighborhood sizes can be slightly shrunk to capture fine details. Other than that, the Bayesian two-color image demosaicing method and system operates similarly as it did in the multi-image demosaicing case.

IV. Structural Overview

The structure of the Bayesian two-color image demosaicer 200 now will be discussed. In order to more fully understand the structure of the Bayesian two-color image demosaicer 200, the details of an exemplary embodiment are presented. However, it should be noted that this exemplary embodiment is only one of several ways in which the Bayesian two-color image demosaicer 200 may be implemented and used.

Figure 7:
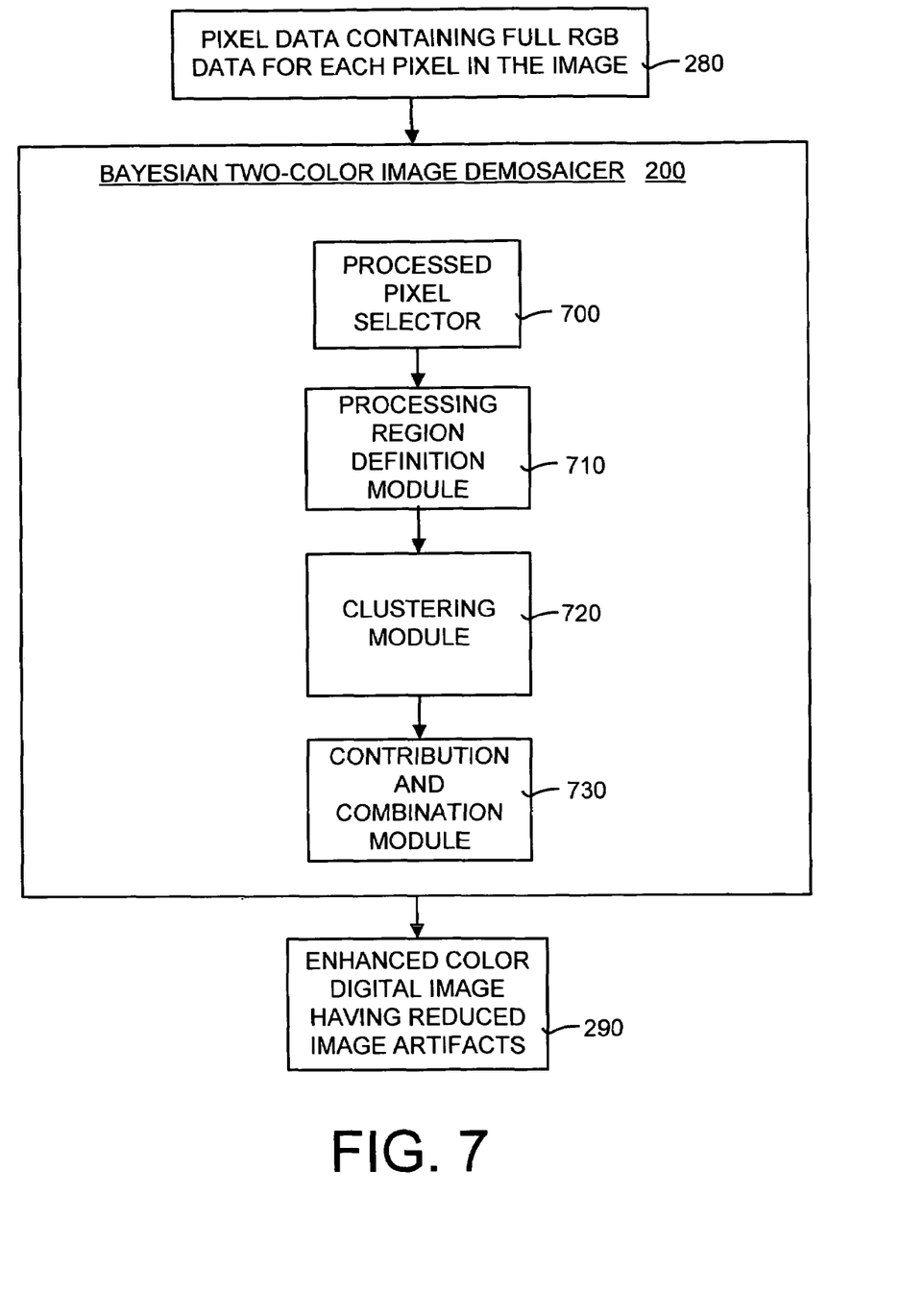
FIG. 7 is a block diagram illustrating the details of the Bayesian two-color image demosaicer shown in FIGS. 1 and 2.

FIG. 7 is a block diagram illustrating the details of the Bayesian two-color image demosaicer 200 shown in FIGS. 1 and 2. In general, the Bayesian two-color image demosaicer 200 processes a digital color image having fully-specified RGB color values for each pixel, finds a final color value for each pixel as a combination of two colors, and outputs the process digital color image having reduced artifacts. Specifically, input to the Bayesian two-color image demosaicer 200 is a pixel data containing fully-specified RGB data for each pixel in the digital color image 280. As explained above, this data is obtained by making a preliminary demosaicing pass on the image. In one embodiment, preliminary demosaicing pass is performed using a high-quality linear interpolation demosaicing technique. Alternatively, other types of demosaicing techniques may be used, such as bilinear interpolation.

The Bayesian two-color image demosaicer 200 includes a processed pixel selector 700, which selects a pixel from the image to be processed. Eventually all the pixels in the image are processed, but the processed pixel selector 700 picks one pixel at a time for processing. A processing region definition module 710 defines a processing region (or patch) around the processed pixel. Typically, the processed pixel is at the center of the processing region. In one embodiment, the processing region is a 5×5 pixel area. In alternative embodiments, processing regions having other sizes (such as a 3×3 pixel area or a 7×7 pixel area) may be used.

The Bayesian two-color image demosaicer 200 also includes a clustering module 720 that determines the favored two colors used to define a final color value for the processed pixel. The clustering module uses a clustering technique to cluster the RGB color values from the pixels in the processing region into two clusters. The mean of each of the two clusters becomes the favored two colors. In one embodiment, a k-means clustering technique with an outlier rejection stage is used for clustering. In alternative embodiments, other types of clustering technique may be used.

The demosaicer 200 also includes a contribution and combination module 730 that determines how much of each of the favored two colors is used in the final color value, and combines the favored two colors to obtain the final color value. The module 730 find the contribution of each of the favored two colors by defining a maximum fractional blended value that maximizes the probability of a fractional blended value given a sample set. The sample set contains sampled color values from pixels in the processing region. The module 730 then combines the maximum fractional blended value and the favored two colors to compute the final color value for the processed pixel. In one embodiment, the favored two colors are linearly combined. In alternative embodiments, the favored two colors are combined in a non-linear manner. The processing by the Bayesian two-color image demosaicer 200 is repeated for each pixel in the image. The output is an enhanced digital color image having reduced image artifacts 290.

V. Exemplary Operating Environment

The Bayesian two-color image demosaicer 200 and method used therein are designed to operate in a computing environment. The following discussion is intended to provide a brief, general description of a suitable computing environment in which the Bayesian two-color image demosaicer and method may be implemented.

Figure 8:
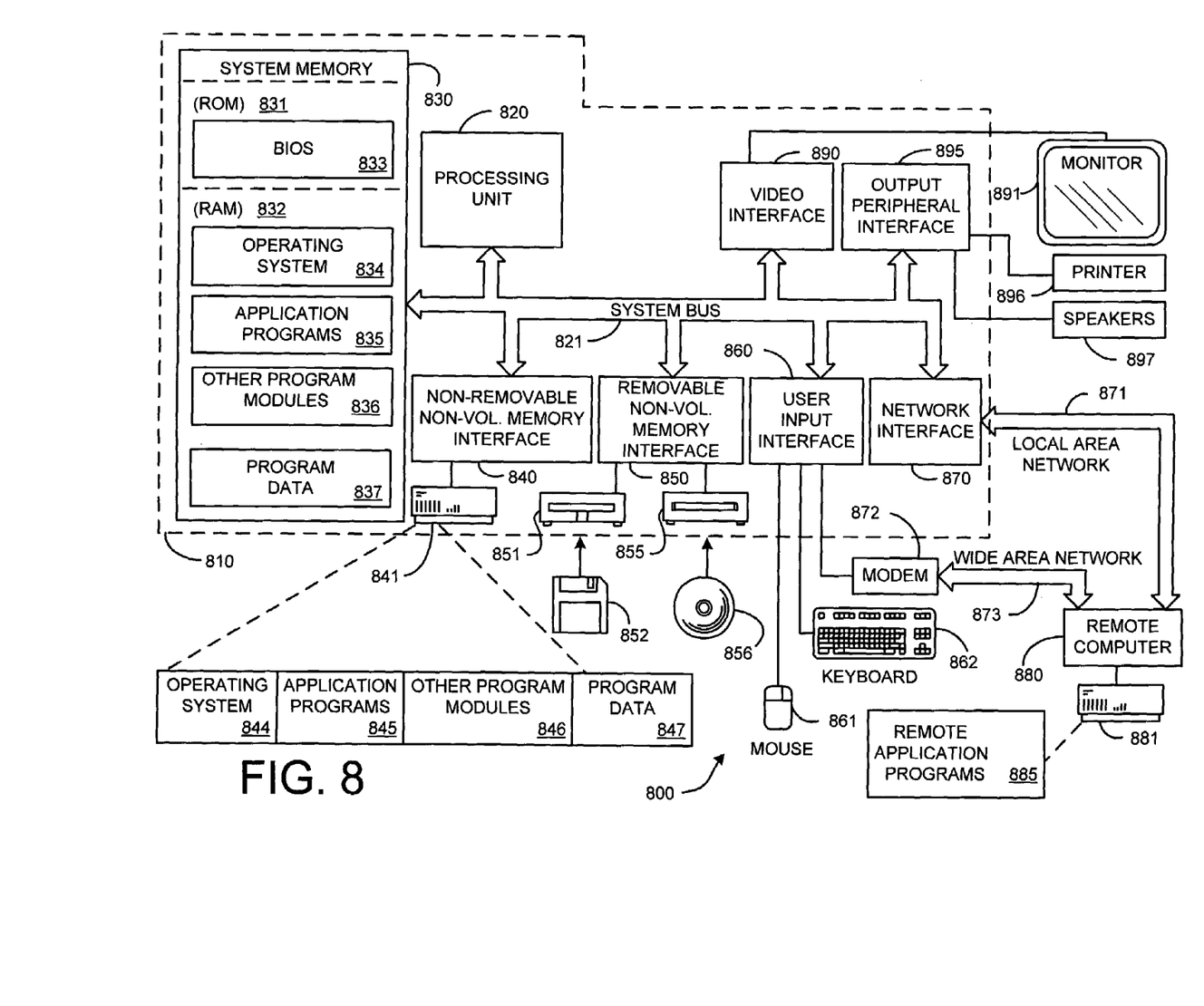
FIG. 8 illustrates an example of a suitable computing system environment in which the Bayesian two-color image demosaicing method and system may be implemented.

FIG. 8 illustrates an example of a suitable computing system environment in which the Bayesian two-color image demosaicer and method may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

The Bayesian two-color image demosaicer and method is operational with numerous other general purpose or special purpose computing system environments or configurations. Examples of well known computing systems, environments, and/or configurations that may be suitable for use with the indirection texture magnification system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The Bayesian two-color image demosaicer and method may be described in the general context of computer-executable instructions, such as program modules, being executed by a computer. Generally, program modules include routines, programs, objects, components, data structures, etc., that perform particular tasks or implement particular abstract data types. The Bayesian two-color image demosaicer and method may also be practiced in distributed computing environments where tasks are performed by remote processing devices that are linked through a communications network. In a distributed computing environment, program modules may be located in both local and remote computer storage media including memory storage devices. With reference to FIG. 8, an exemplary system for Bayesian two-color image demosaicer and method includes a general-purpose computing device in the form of a computer 810 (the first computing device 270 in FIG. 1 and the second computing device 295 in FIG. 2 are examples of the computer 810).

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing a digital color image, comprising:
    using a general-purpose computing device having a processor to perform the following:
        obtaining fully-specified RGB triple color values for each pixel in the digital color image;
        grouping into two clusters the pixel color values for pixels in a processing region around a selected pixel in the digital color image;
        finding a mean of each of the two clusters to generate a first favored color value corresponding to a first mean for a first cluster and a second favored color value corresponding to a second mean for a second cluster;
        defining a fractional blended value that specifies how much contribution the first favored color value and the second favored color value gives to a final color value;
        determining a maximum fractional blended value for the selected pixel defined as a blend of the first favored color value and the second favored color value that maximizes a probability of the fractional blended value given each of the pixel color values in the processing region; and
        using the maximum fractional blended value and the first favored color value and the second favored color value to obtain the final color value for the selected pixel in the digital color image to perform demosaicing of the digital color image to obtain an enhanced digital color image having reduced image artifacts.

2. The method of claim 1, further comprising using a preliminary pass demosaicing technique to obtain the fully-specified RGB triple color values for each pixel.

3. The method of claim 2, further comprising using a high-quality linear interpolation demosaicing technique to obtain the fully-specified RGB triple color values for each pixel.

4. The method of claim 1, further comprising defining the processing region in the digital color image as centered at a the selected pixel.

5. The method of claim 1, further comprising grouping color values for pixels in the processing region into the two clusters using a clustering technique.

6. The method of claim 5, wherein the clustering technique is a k-means clustering technique.

7. The method of claim 5, further comprising using an outlier rejection technique with the clustering technique to improve clustering results.

8. A computer-readable storage medium having stored and encoded thereon computer-executable instructions for processing a digital color image having an associated Bayer color filter, comprising:

performing a preliminary demosaicing pass on the digital color image to obtain fully-specified RGB color values for each pixel in the digital color image using samples obtained from the Bayer color filter;

selecting a pixel from the digital color image for processing to obtain a selected pixel;

grouping into two clusters the fully-specified RGB color values for pixels in a processing region around the selected pixel;

finding a mean of each of the two clusters to generate a first favored color value corresponding to a first mean for a first cluster and a second favored color value corresponding to a second mean for a second cluster;

defining a fractional blended value that specifies how much contribution the first favored color value and the second favored color value gives to a final color value;

determining a maximum fractional blended value for the selected pixel defined as a blend of the first favored color value and the second favored color value that maximizes a probability of the fractional blended value given each of the pixel color values in the processing region;

using the maximum fractional blended value and the first favored color value and the second favored color value to obtain the final color value for the selected pixel to perform demosaicing of the digital color image; and repeating the selecting, grouping, finding, defining, determining, and using process actions set forth above for each pixel in the digital color image such that artifacts in the digital color image are reduced.

9. The computer-readable storage medium of claim 8, further comprising using a high-quality linear interpolation technique during the preliminary demosaicing pass.

10. The computer-readable storage medium of claim 8, further comprising:

centering the processing region around the selected pixel;

clustering the fully-specified RGB color values from pixels in the processing region into two clusters using a k-means clustering technique having outlier rejection, wherein the first favored color value and the second favored color value each have RGB color values.

11. The computer-readable storage medium of claim 10, further comprising:

computing the fractional blended value for the selected pixel using sample color values from the Bayer color filter for pixels in the processing region.

12. A computer-implemented process for demosaicing a digital color image to reduce artifacts in the digital color image, comprising:

using the computer having a processor to perform the following:

performing high-quality linear interpolation demosaicing on the digital color image to obtain RGB triple color values for each pixel in the digital color image;

selecting a pixel in the digital color image to process and designating this pixel as a processed pixel;

defining a processing region centered at the processed pixel having a 5×5 pixel area;

clustering RGB color values of pixels in the processing region into two clusters using a clustering technique, finding a mean of each of the two clusters to generate a first favored color value corresponding to a first mean for a first cluster and a second favored color value corresponding to a second mean for a second cluster;

defining a fractional blended value that specifies how much contribution the first favored color value and the second favored color value gives to a final color value;

determining a maximum fractional blended value for the processed pixel defined as a blend of the first favored color value and the second favored color value that maximizes a probability of the fractional blended value given each of the pixel color values in the processing region; and using the maximum fractional blended value and the first favored color value and the second favored color value to obtain the final color value for the processed pixel in the digital color to perform demosaicing of the digital color image and obtain a demosaiced version of the digital color image having reduced image artifacts.

13. The computer-implemented process as set forth in claim 12, further comprising computing the maximum fractional blended value, $\hat{\alpha}$, by maximizing the probability of the fractional blended value, $\alpha$, given by an equation:

$$\hat{\alpha} = \underset{\alpha}{\mathrm{argmax}}\, P(\alpha \mid S, \overline{J}, \overline{K}),$$

wherein $\overline{J}$ is the first favored color value and $\overline{K}$ is the second favored color value for the processed pixel, and S is a set of samples of each pixel in the processing region.

14. The computer-implemented process as set forth in claim 13, further comprising computing the final color value, C, for the processed pixel using an equation:

$$C = (1-\hat{\alpha})\overline{J} + \hat{\alpha}\overline{K}.$$

* * * * *